United States Patent [19]
Miyamoto

[11] Patent Number: 5,496,229
[45] Date of Patent: Mar. 5, 1996

[54] VALVE ACTUATOR RESPONSIVE TO GEAR SHIFT FOR REDUCING TORQUE SHOCK

[75] Inventor: Katsuhiko Miyamoto, Kyoto, Japan

[73] Assignee: Mitsubishi Jidosha Kogyo Kabushiki Kaisha, Tokyo, Japan

[21] Appl. No.: 37,361

[22] Filed: Mar. 26, 1993

[30] Foreign Application Priority Data

Mar. 26, 1992 [JP] Japan ................................. 4-068238

[51] Int. Cl.$^6$ .................................................. B60K 41/06
[52] U.S. Cl. ................................................................ 477/111
[58] Field of Search .......................... 477/111; 123/198 F

[56] References Cited

U.S. PATENT DOCUMENTS

| | | | |
|---|---|---|---|
| 4,104,991 | 8/1978 | Abdoo | 477/111 |
| 4,114,863 | 3/1979 | Abdoo | 477/111 |
| 4,227,505 | 10/1980 | Larson et al. | 123/198 F |
| 4,535,732 | 8/1985 | Nakano et al. | |
| 5,099,806 | 3/1992 | Murata et al. | 123/198 F |

FOREIGN PATENT DOCUMENTS

| | | |
|---|---|---|
| 4122827 | 1/1962 | Germany . |
| 60-50240 | 3/1985 | Japan . |

OTHER PUBLICATIONS

Patent Abstracts of Japan; Pub. No.: JP60043130; dated Mar. 1985 Takahashi Minoru Control Method for Internal–Combustion Engine.

Primary Examiner—Timothy S. Thorpe
Attorney, Agent, or Firm—Birch, Stewart, Kolasch & Birch

[57] ABSTRACT

A valve moving control apparatus for an internal combustion engine comprising a control device for switching at least one valve by controlling a driving condition of an intake/exhaust valve, a load detecting device, a switch control device for outputting a switch signal to the control device, and a gear shift detecting device. The gear shift detecting device detects whether a gear is shifted to a relatively low gear in a gearbox. If the gear is shifted to a relatively low gear, a switching point for switching an actuation of the valve is shifted to a low load side in order to reduce torque shock caused by switching.

12 Claims, 8 Drawing Sheets

MAP A

FIG.4

MAP B

VALVE ACTUATOR RESPONSIVE TO GEAR SHIFT FOR REDUCING TORQUE SHOCK

BACKGROUND OF THE INVENTION

The present invention relates to a valve-moving control apparatus for intermitting operation of a predetermined number of valves of cylinders of an engine in accordance with a load applied to the internal combustion engine and a method therefor.

In an internal combustion engine for intermitting operation of a predetermined number of valves of cylinders in accordance with the load applied to the engine, when an opening degree of a throttle is low at a certain rotational speed, a large amount of axis torque output is obtained by intermitting actuations of some valves of the cylinders and when the open degree of the throttle is high at this rotational speed, a large amount torque output is obtained by actuating all valves.

Figure 9:
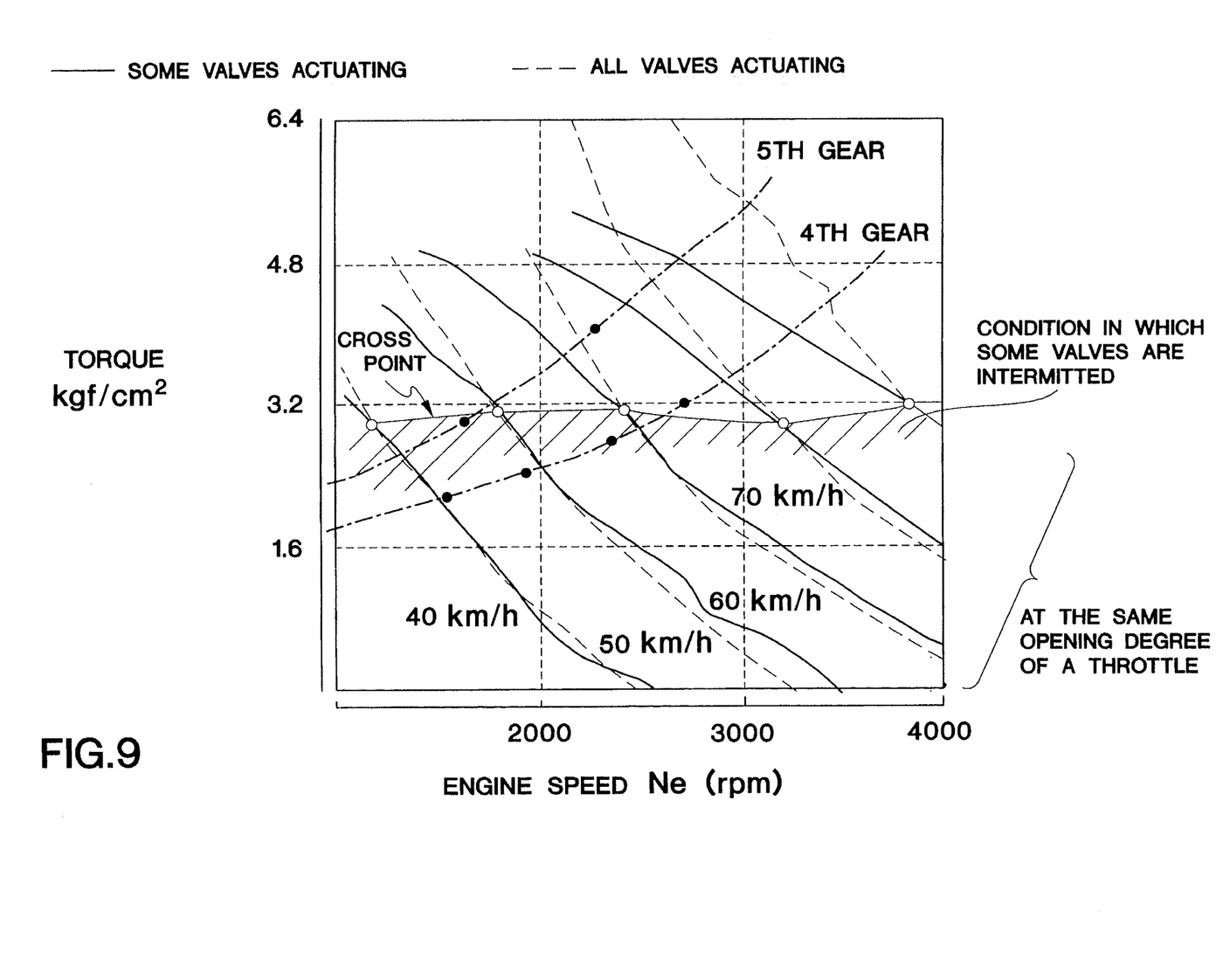
FIG. 9 is a graph for showing crossing point of first and second condition described later.

Accordingly, a switch for intermitting actuations of some valves of the cylinders or actuating all valves is usually operated at a timing (cross point) when the torque output of an internal combustion engine in which some valves are intermitted, and the torque output of the engine in which all valves are actuated, are equal to each other at the same opening degree of a throttle as shown in FIG. 9. When the switch is shifted at the cross point, torque shock does not occur, since the torque output does not change.

However, if an internal combustion engine in which some valves of the cylinders are intermitted is changed to actuate all the valves, inner pressure at the intake pipe of all the cylinder is very high immediately after the operation is changed, and a large volume of air is suddenly intaken into all the cylinders, so that a large torque occurs and its shock is transmitted to an internal combustion engine's mounts, a driving mechanism and wheels of the vehicle in which the engine is mounted.

The shock caused by such a torque difference is not very much when a gear is shifted to high speed traveling such as the third, the fourth gear and the fifth gear, for which a gear change ratio is relatively low. On the other hand, the shock is largely transmitted to a chassis when the gear is shifted to a low speed traveling, such as the first or the second gear, for which the gear change ratio is large.

SUMMARY OF THE INVENTION

To resolve the above described problem, a purpose of the present invention is to provide a valve moving apparatus for an internal combustion engine comprising a control device for switching at least one valve of a cylinder by controlling a driving condition of intake and exhaust valves in accordance with a driving condition of the internal combustion engine, a load detecting device for detecting load applied to the internal combustion engine, a switch control device for outputting a switch signal to the control device in accordance with the load applied to the engine, and a gear shift detecting device for detecting a gear shifting of a gearbox, wherein the gear shift detecting device detects a relatively low gear shift and the switch control device outputs the switch signal in a case that the load is relatively low in comparison a load when the gear shift detecting device detects a relatively high gear shift.

DETAILED DESCRIPTION OF THE PREFERRED EMBODIMENT

Figure 2:
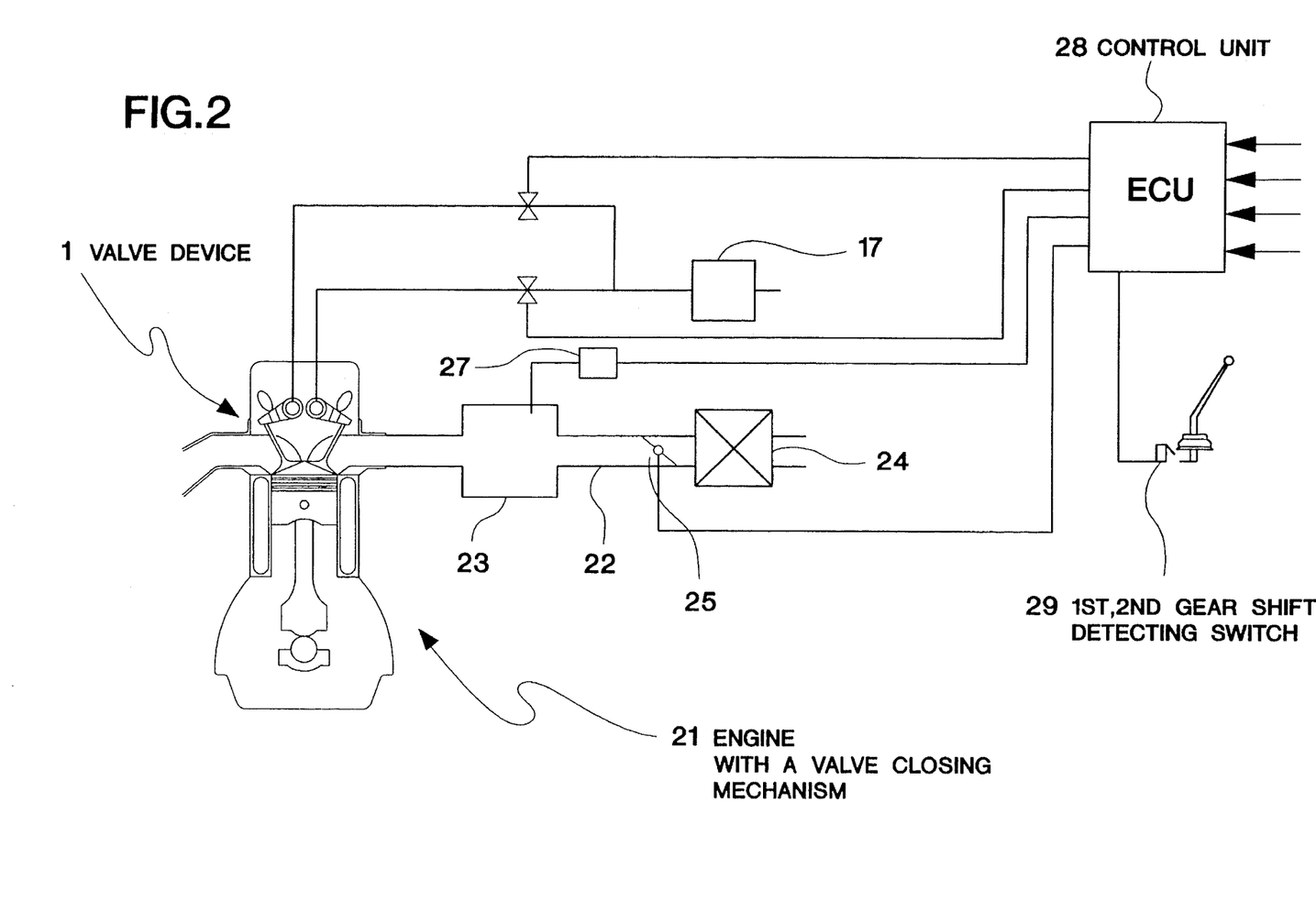
FIG. 2 shows a block diagram of a system of an internal combustion engine with a valve-moving mechanism.

One embodiment of the present invention will be described with reference to drawings. FIG. 2 shows a fundamental system of an internal combustion engine with a valve closing mechanism. 21 refers an engine with a valve closing mechanism. A valve device 1 for closing a valve of a cylinder at low speed is provided as an intake valve. The valve device 1 is capable of determining a timing for closing the valve of the cylinder at low and high speed.

FIG. 2 also shows an intake pipe 22, a surge tank 23, an air cleaner 24 provided at an inlet of an intake pipe 22 and a throttle valve 25. An opening degree of the throttle valve 25 is detected by a throttle position sensor (not shown) and a signal is input to an electronical control unit (ECU) 28. A boost sensor 27 for detecting a boost is provided at the surge tank 23 and its data is input to the electronical control unit 28. A switch 29 for detecting the first forward gear shift and second forward gear shift is provided at a transmission side. If a gear is shifted to the first gear or the second gear, the switch 29 inputs ON signal to the electronical control unit 28.

A valve device 1 of the embodiment according to the present invention is shown in FIG. 5 through FIG. 8. The valve device 1 includes a cam shaft 2 and a rocker shaft part 3. The cam shaft 2 provides a low speed cam 4 with a small lifting amount and a high speed cam 5 with a large lifting amount.

Figure 5:
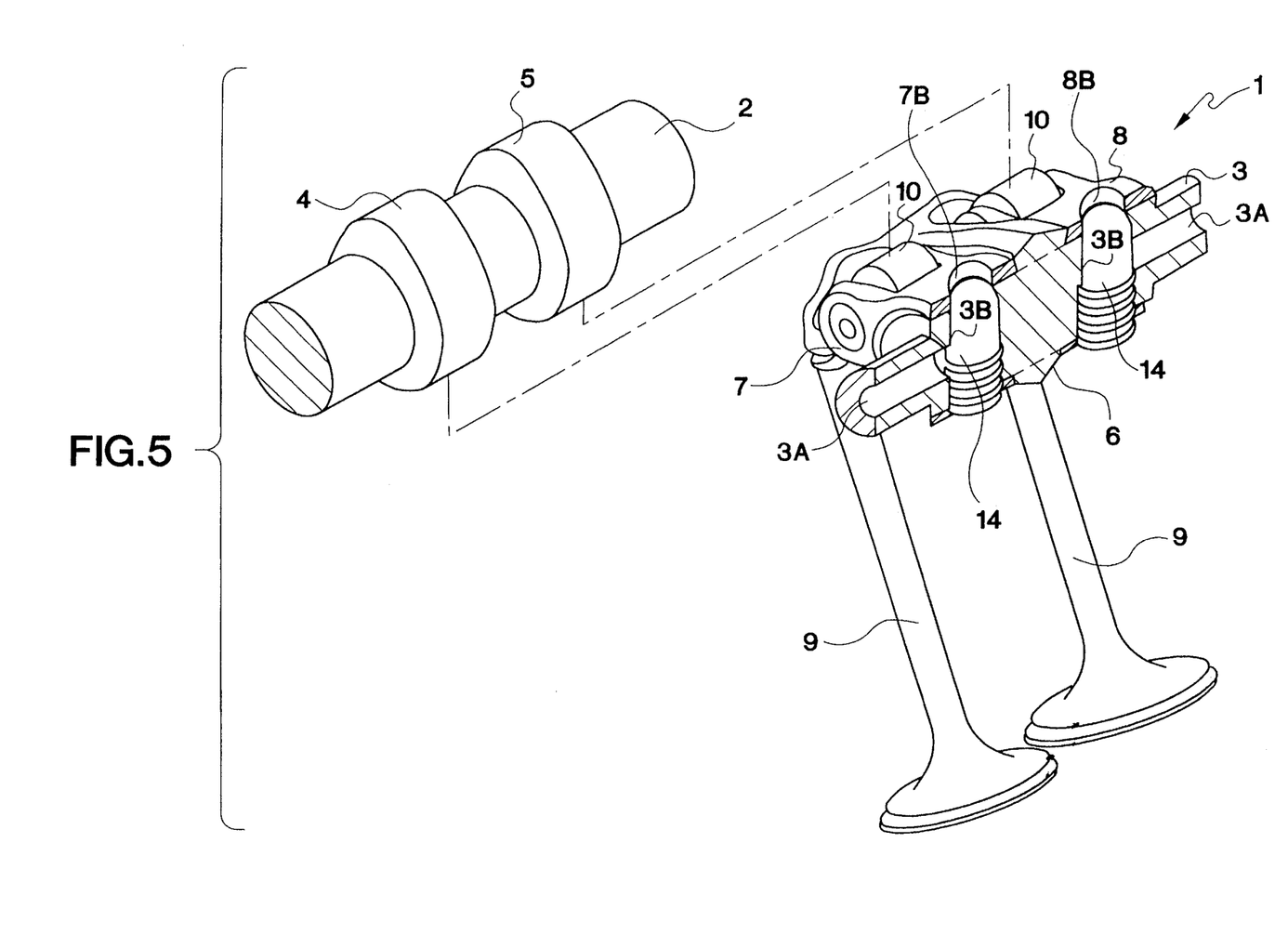
FIG. 5 is a perspective view of an essential part of a valve mechanism.

A T-shaped lever 30 is integrally formed with the rocker shaft part 3 and has an arm portion 6 having a T-shape of which a base end is mounted on a middle portion of the rocker shaft part 3. Sub-rocker arms 7 and 8 are provided on the both sides of the rocker shaft part 3.

A sliding end of the arm portion 6 contacts with a valve stem end of an intake valve 9.

On the other hand, each base end of the sub-rocker arms 7 and 8 are pivotably rotated by the rocker shaft part 3. Roller bearings 10 are provided at the sliding ends of the sub-rocker arms 7 and 8, respectively.

Figure 6:
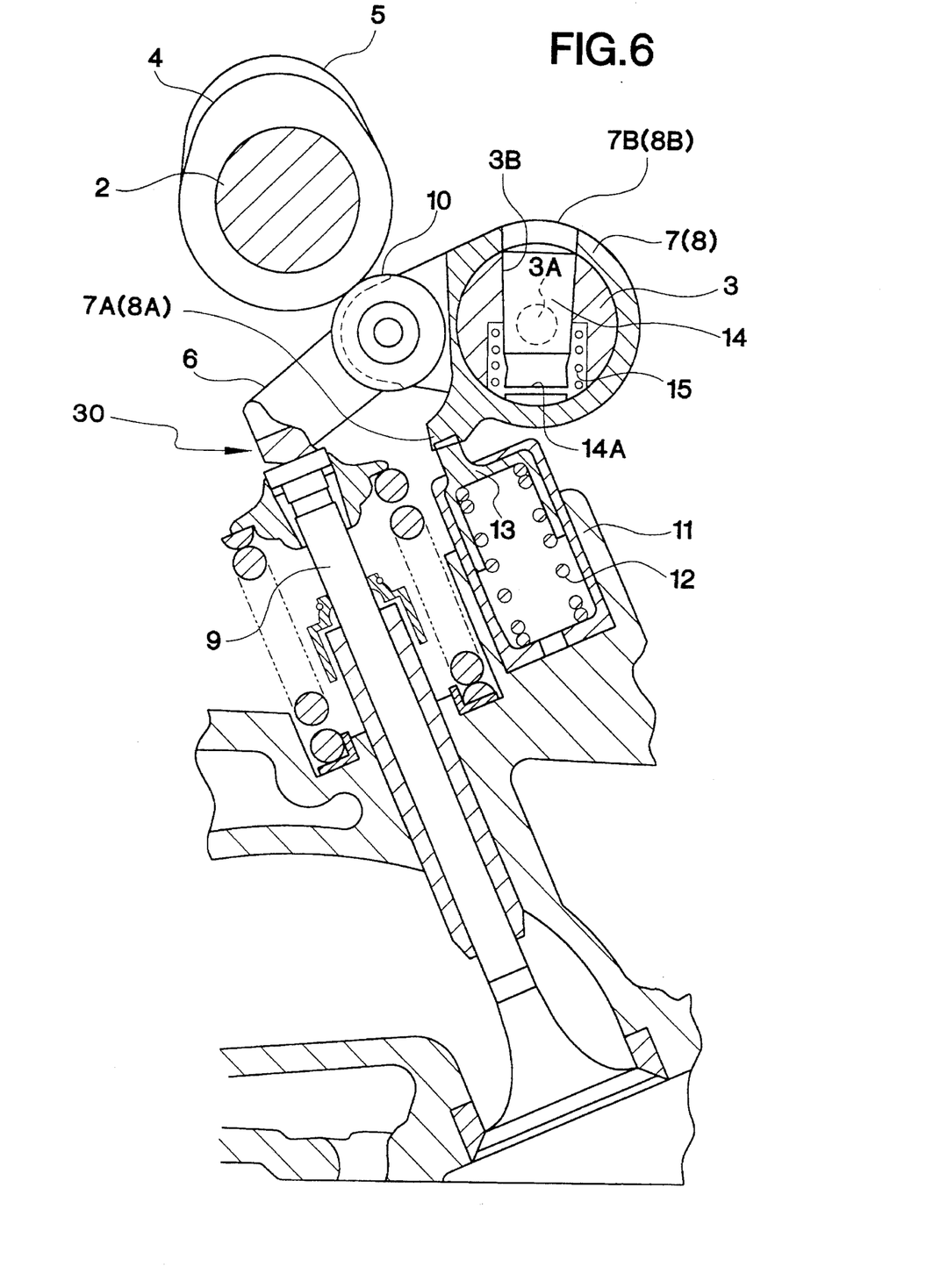
FIG. 6 is a cross sectional view of a part of FIG. 5.

FIG. 6 shows a cross sectional view of the low speed cam 4. In FIG. 6, the sliding ends of the sub-rocker arms 7 and 8 include protrusions 7A and 8A apart from the supporting portions for the roller bearings 10, respectively. The protrusion 7A contacts with a plunger 13 positioned at a top end of an arm spring 12 in a cylinder head 11. In FIG. 6, the protrusion 7A can rotate clockwisely in order to press the roller bearing 10 against the cam 4.

On the other hand, engaging hole 7B (8B) penetrating the sub-rocker arm 7 (8) from a central point thereof along a radial direction is provided on the sub-rocker arm 7 (8), respectively. The engaging holes 7B and 8B serve passages for respective connecting plunger as described below.

A hydraulic path 3A is provided at an axial central portion along the longitudinal axis in within the rocker shaft part 3. A through hole 3B is provided perpendicular to the hydraulic path 3A at a position confronting with the engaging hole 7B (8B). A center of the engaging hole 7B (8B) coincides with the center of the through hole 3B when a base circle of the cam 4 (5) confronts with the roller bearing 10.

In each through hole 3B, a connecting plunger 14 for sliding between the through hole 3B and the engaging hole 7B (8B) is provided. A head portion of the connecting plunger 14 is located at a side of the engaging hole 7B (8B) formed in the sub-rocker arm 7 (8). Usually, the head portion is biased toward the downward direction by a pressurized spring 15 provided between a portion 14A formed at an opposite end of the head portion and the supporting portion of the rocker shaft part 3 in order to bias the head portion toward the through hole 3B away from the the engaging hole 7B (8B).

Figure 8:
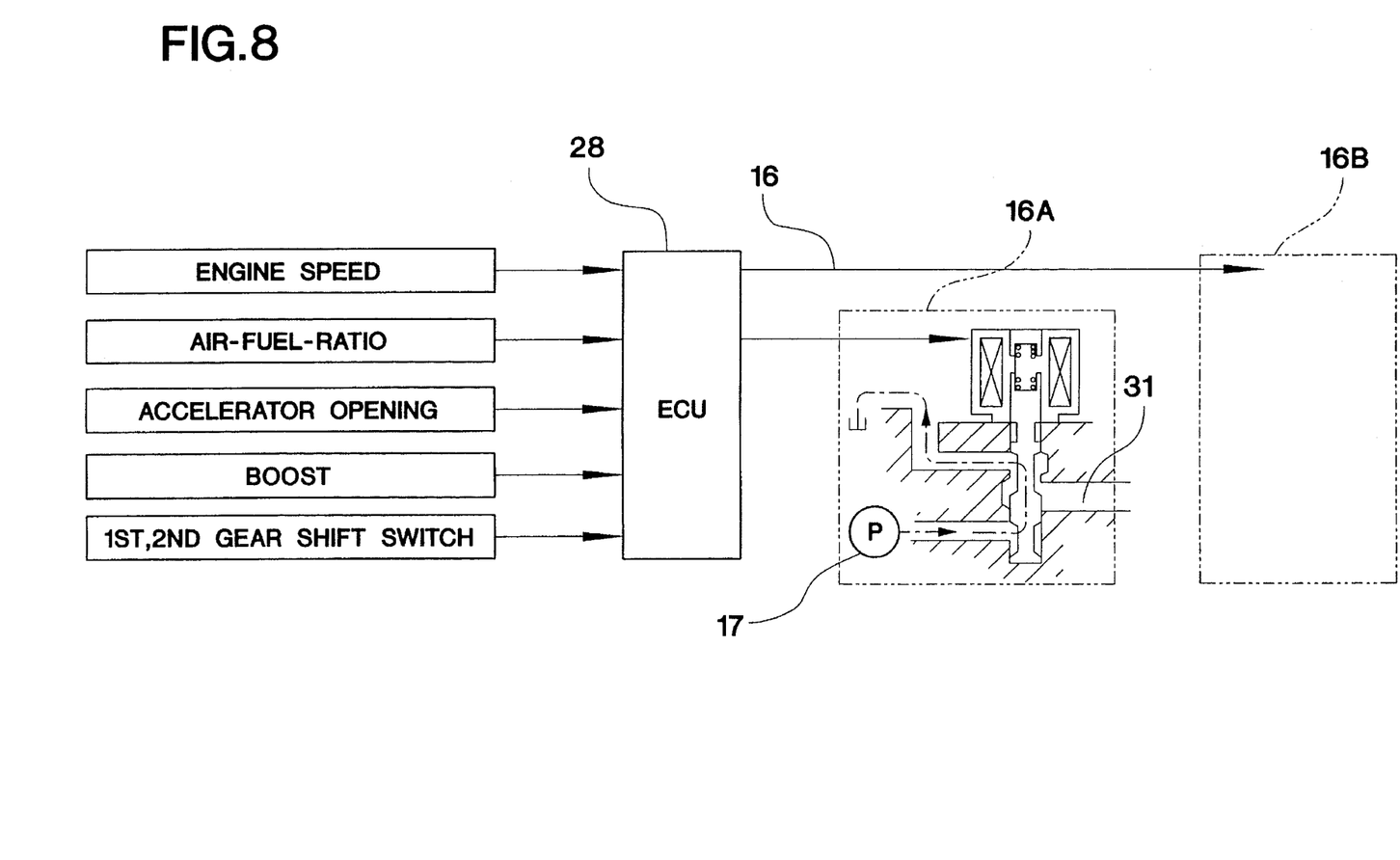
FIG. 8 is a block diagram for determining a hydraulic pressure.

On the other hand, an outlet path 31 of a hydraulic setting device 16 is connected to the hydraulic path 3A in the rocker shaft part 3. The hydraulic setting device 16 controls an inner pressure of the hydraulic path 3A according to driving conditions. The device 16 has electro-magnetic switch valves 16A and 16B. The switch valves 16A and 16B are controlled by the electrical control unit 28.

The electro-magnetic switch valves 16A and 16B are provided at two lines, a low speed traveling line and a high speed traveling line, respectively. Each of the switch valves 16A and 16B has three positions, that is, a first position for introducing a path from a hydraulic pump 17, a second position for introducing a return path under an atmospheric releasing pressure, and a third position for introducing a hydraulic path 3A in the rocker shaft part 3. When each of the switch valves 16A and 16B are not energized, they are positioned at the second position to return hydraulic oil from the hydraulic pump 17 to the return path. In FIG. 8, although the electro-magnetic switch valve 16B provided at a line for high speed is not shown, the structure and operation thereof is the same at that of the electro-magnetic switch valve 16A.

Figure 7:
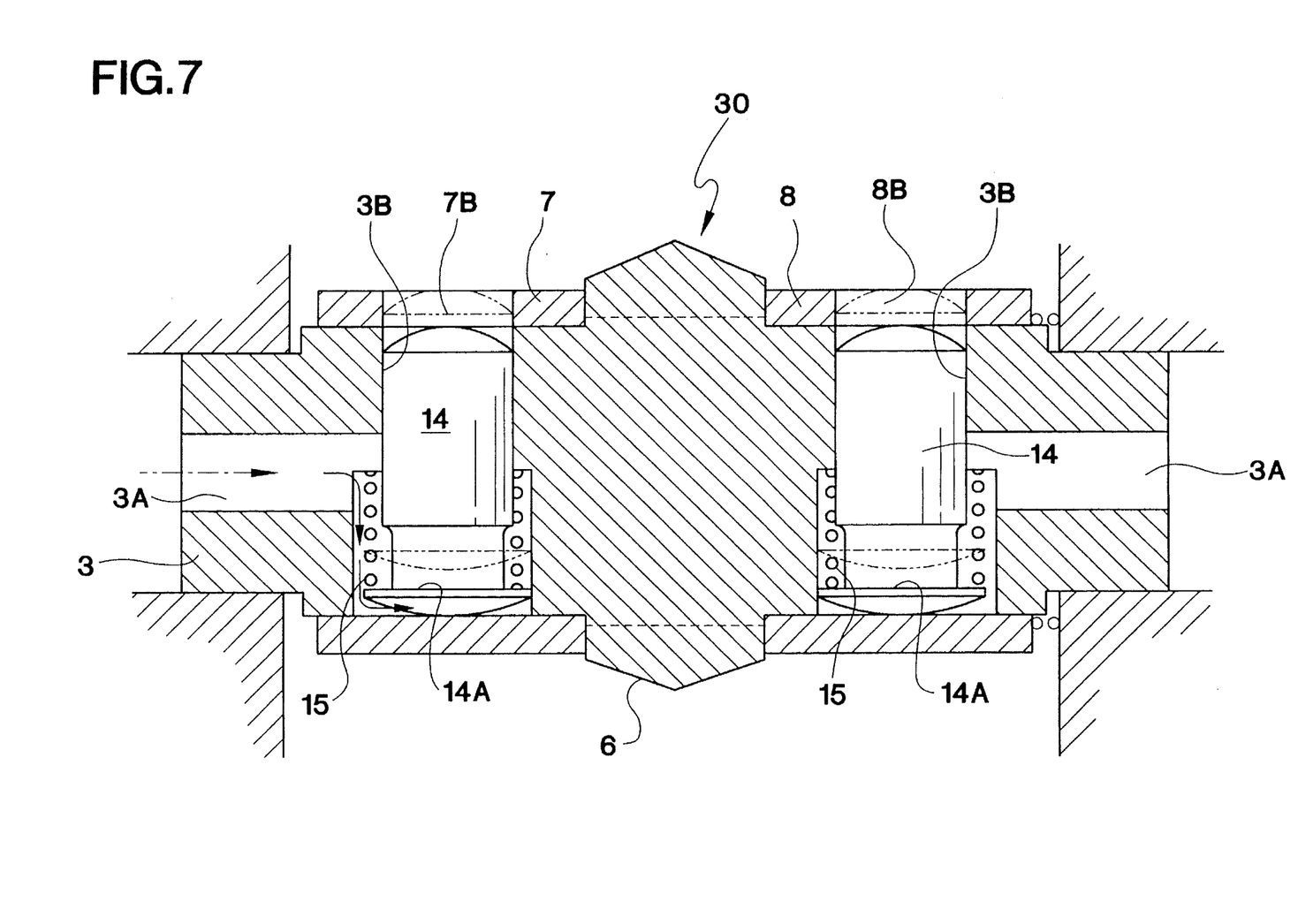
FIG. 7 is a cross sectional view of FIG. 5 along a longitudinal line of a rocker shaft part.

Accordingly, the pressure in the hydraulic path 3A is maintained at a low level so that the connecting plunger 14 can be released from the engaging hole 7B (8B) by the pressurized spring 15 as shown in FIG. 7.

On the other hand, various data from an engine rotational sensor, an oxygen sensor for detecting idle fuel consumption and a throttle position sensor for detecting an open degree of an accelerator as well as the other sensors are input to the electronical control unit 28. The electronical control unit 28 judges whether a vehicle drives under a low speed condition or a high speed condition and how much load is applied to the vehicle corresponding to the input data from each of the sensors so that the electronical control unit 28 can output a driving signal to the electro-magnetic switch valves 16A and 16B.

Accordingly, when the electro-magnetic switch valve 16A (16B) is energized, hydraulic oil is supplied from the hydraulic pump 17 to the hydraulic path 3A in order to increase the inner pressure in the path 3A.

In the above system, when the electronical control unit 28 determines that a vehicle drives at relatively low speed, which is judged from input data about the engine rotational speed, air fuel ratio and the opening degree of an accelerator, the electro-magnetic switch valve 16A, provided at a low speed traveling line, is energized and the electro-magnetic switch valve 16B provided at a high speed traveling line, is set to a normal position.

Hydraulic oil from the hydraulic pump 17 is switched to supply the hydraulic path 3A by energizing the electro-magnetic switch valve 16A provided at the low speed traveling line. The electro-magnetic switch valve 16B positioned at the high speed traveling line is maintained at the initial position by not energizing the electro-magnetic valve 16B so that the supply of hydraulic oil can be maintained precluded to the hydraulic path 3A for the high speed traveling line.

Accordingly, as shown by broken line in FIG. 7, the rocker shaft part 3 and the first sub-rocker arm 7 are integrally moved by protruding the connecting plunger 14 toward the engaging hole 7B of the sub-rocker-arm 7 against the spring force of the pressure spring 15 so that the connecting plunger 14 provided at the low speed traveling line is controlled to close the electro-magnetic switch valve 16A for the low speed cam 4. As shown by continuous lines in FIG. 7, the connecting plunger 14 at the high speed line is maintained at a position in the through hole 3B of the rocker shaft 3 and the driving force is not transmitted between the second sub-rocker arm 8 and the rocker shaft part 3 so that the opening/closing of the corresponding valve can not be controlled by the high speed cam 5.

On the other hand, when the rotational speed of the engine approaches high speed range, the electro-magnetic switch valve 16B provided at the high speed line is conversely energized with respect to the energization of the electro-magnetic switch valve 16A provided for low speed. Accordingly, in this case, as shown by the broken lines in FIG. 7, the connecting plunger 14 provided at the high speed traveling line is protruded toward the engaging hole 8B of the second sub-rocker arm 8 so that the rocker shaft 3 and the second sub-rocker arm 8 integrally move. Driving force is transmitted between the second sub-rocker arm 8 provided at the high speed line and the rocker shaft part 3. On the other hand, the connecting plunger 14 provided at the low speed traveling line is released from the engaging hole 7B and the connecting plunger 14 is positioned in a retracted position in the through hole 3B.

As a result, a valve opening/closing control of the valve is accomplished by the high speed cam 5.

During high speed traveling, for example, if a throttle position sensor judges that the vehicle is driven under low load condition such as an idling condition, a valve opening/closing control for one or more selected cylinder is not operated by cams provided at the high and low speed side. That is, under such condition, in the electrical control unit 28, energization of the electric-magnetic switch valves 16A and 16B positioned at the low speed traveling line and the high speed traveling line are released.

Accordingly, pressurized hydraulic oil is not supplied by any electro-magnetic direction switch valves 16A, 16B positioned at the low speed traveling line and the high speed traveling line so that the pressure in the oil path 3A of the rocker shaft part 3 is not increased. Thereby, the connecting plungers 14 are positioned at the normal retracted position which is inside of the through hole 3B by the pressure spring 15. Driving force is thus released between the first and second sub-rocker arms 7 and 8 and a rocker shaft part 3.

Thus, the sub-rocker arms 7 and 8 are maintained in a valve intermitting condition which is not controlled to close and open by the low speed and high speed cams 4 and 5.

Thus, the valve is maintained in its closed position. Under this condition, the position of the connecting plunger 14 is shifted corresponding to the rotational speed of the engine after the low load condition is released.

Figure 3:
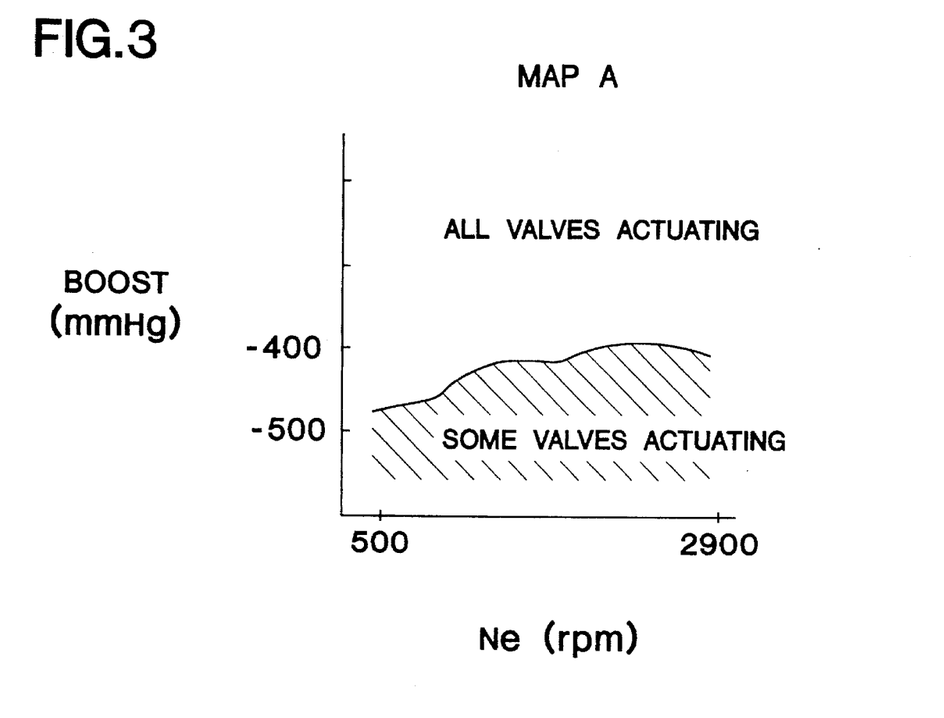
FIG. 3 is a graph for a border line between a first range of a cylinder closing and a second range of the cylinder opening while a gearbox is shifted to the gears except the first forward gear and the second forward gear.
Figure 4:
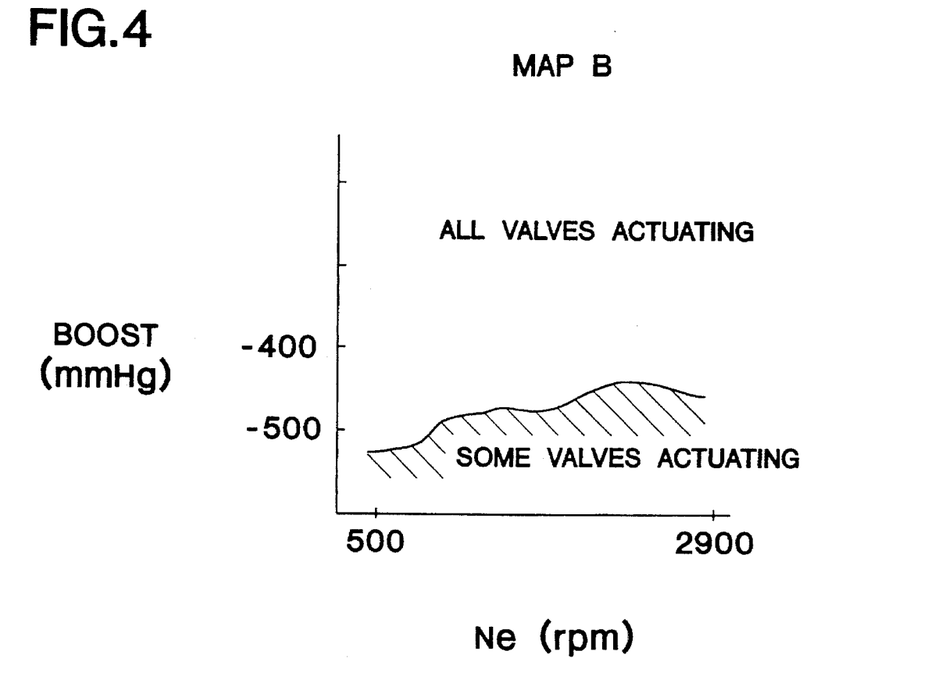
FIG. 4 is a graph showing a border line between a first range of a cylinder closing and a second range of the cylinder opening while the gearbox is shifted to the first forward gear or the second forward gear.

If a gear is shifted to the first forward gear or second forward gear in the gearbox, a switching from a first condition, in which some valves are closed to a second condition, in which all the valves are opened is operated in a low load condition in order to reduce the shock caused by shifting as small as possible. FIG. 3 shows a shift judging map A in which a gear is shifted to a gear except the first forward gear and the second forward gear, that is, the gear shift detecting switch outputs an OFF signal. A border line in FIG. 3 shows a judging line. The lower side shows the first condition and the upper side shows the second condition. On the other hand, FIG. 4 shows a map B in which a gear is shifted to a relatively high gear. The border line in FIG. 4 shows a judging line. The lower side shows the first condition and the upper side shows the second condition. Upon comparing FIG. 3 and FIG. 4, the load on the border line in FIG. 4 is lower than the load on the border line in FIG. 3. The load as a boost detected by the boost sensor 27. In the maps A and B, the lateral axis refers to the rotational speed Ne (rpm) and the vertical axis is the boost.

FIG. 9 shows crossing points of the first and second conditions. In FIG. 9, continuous lines show the first conditions depending on different speeds of the vehicle at the same opening degrees of a throttle and broken lines show the second conditions depending on corresponding different speeds of the vehicle at the same opening degrees of the throttle. A right increasing continuous line shows a gearbox with five forward gears while a right increasing alternate broken short line shows a gearbox with four forward gears.

Figure 1:
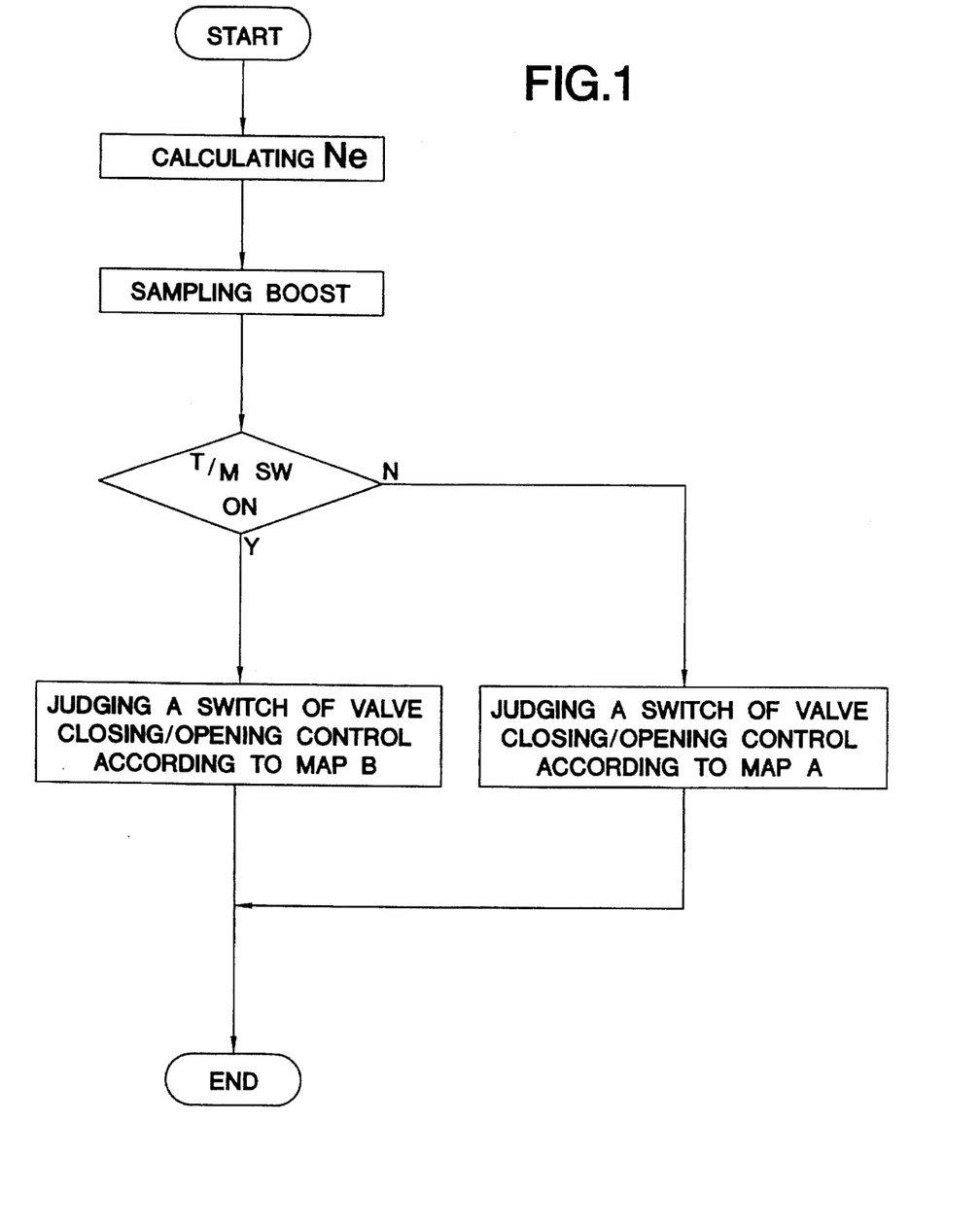
FIG. 1 shows a flow chart of one embodiment according to the present invention.

FIG. 1 shows a flow chart for switching between the first condition and the second condition. Under the control, a rotational speed of an engine Ne and the boost are detected at first. Then it is judged whether the switch 29 for detecting the first and second gears is ON or not. If it is detected as OFF, it means that the gear is not shifted to the first nor the second gear so that the shift between the first condition and the second condition is operated based on the map A.

If it is judged that the switch 29 for detecting the first forward gear and the second forward gear is ON, the switch between the first condition and the second condition is operated based on the map B of which a cross point is lower than the corresponding cross point in the map A. Therefore, the shock caused by shifting can be reduced.

In this embodiment, a load condition is judged as the boost. Other parameters, for example, an intake air volume with respect to rotational speed of the engine, may be used. It will be obvious that the valve device of the present invention thus described may be varied in many ways.

Such variations are not to be regarded as a departure from the spirit and scope of the invention, and all such modifications as would be obvious to one skilled in the art are intended to be included within the scope of the following claims.

According to a control method for shifting the first condition in which some valves are closed and the second condition in which all the valves are actuated in an internal combustion engine with a valve-moving mechanism according to the present invention, if a gearbox is shifted to a relatively low gear shift, the shift is operated at a relatively low load condition so that an occurrence caused by a torque can be prevented and a shock caused by shifting can be reduced as small as possible.

What is claimed is:

1. A valve moving apparatus for an internal combustion engine comprising:

control means for switching at least one valve of a cylinder by controlling a driving condition of an intake/exhaust valve in accordance with a driving condition of the internal combustion engine, load detecting means for detecting a load applied to the internal combustion engine, switch control means for outputting a switch signal to said control means so as to reduce number of actuating valves at a time when the load becomes equal or lower than a predetermined level and to increase number of actuating valves at a time when the load becomes higher than said predetermined level, and gear shift detecting means for detecting a gear shift in a gearbox, wherein in the event that said gear shift detecting means detects a relatively low gear shift, said switch control means changes said predetermined level to another predetermined level lower than said predetermined level.

2. The valve moving apparatus as claimed in claim 1, wherein said load detecting means comprises a pressure sensor provided at an intake pipe of the engine.

3. The valve moving apparatus as claimed in claim 1, wherein said load detecting means comprises a sensor for detecting rotational speed of the engine.

4. The valve moving apparatus as claimed in claim 1, wherein said load detecting means comprises a sensor for detecting an open degree of a throttle valve, said sensor being provided at an intake pipe of the engine.

5. The valve moving apparatus as claimed in claim 1, wherein said load detecting means comprises a sensor for detecting a fluid volume of air, said sensor being provided at an intake pipe of the engine.

6. The valve moving apparatus as claimed in claim 1, wherein said relatively low gear shift is the first forward speed gear or the second forward speed gear.

7. The valve moving apparatus as claimed in claim 1, said switch control means includes:

a cam shaft on which a low speed cam and a high speed cam are mounted, a lever member provided adjacent to said cam shaft, said level member having a rocker shaft part pivotably mounted on a supporting member of the engine and an arm portion integrally formed with said rocker shaft part, said arm portion contacting with an intake/exhaust valve, a low speed rocker arm pivotably mounted on said rocker shaft part, said low speed rocker arm being rocked by said low speed cam, a high speed rocker arm pivotably mounted on said rocker shaft part, said high speed rocker arm being rocked by said high speed cam, a plurality of arm spring means for pressing each of said rocker arms to contact one of said cams, a switch mechanism for selectively engaging each of said rocker arms with said rocker shaft part, and a hydraulic oil supply means for actuating said switch mechanism by hydraulic oil.

8. The valve moving apparatus as claimed in claim 7, wherein one of said rocker arms is pivotably mounted on said rocker shaft part on each side of said arm portion.

9. The valve moving apparatus as claimed in claim 7, wherein said low speed rocker arm and said high speed rocker arm are driven by said low speed cam and said high speed cam, respectively, and a roller bearing is rotatably provided with respect to each said rocker arms.

10. The valve moving apparatus as claimed in claim 1, wherein said switch control means includes at least two maps determined by the load and the rotational speed of the engine.

11. The valve moving apparatus as claimed in claim 10, wherein one of said maps is utilized when a gearbox is shifted to said relatively high gear and another of said maps is utilized when said gearbox is shifted to said relatively high gear.

12. The valve moving apparatus of claim 10, wherein said switch signal is output at a relatively high load condition while the rotational speed of the engine is increased in said maps.

* * * * *